United States Patent
Nishimura

(10) Patent No.: US 8,410,360 B2
(45) Date of Patent: Apr. 2, 2013

(54) SEALING STRUCTURE FOR WIRE LEAD-OUT HOLE

(75) Inventor: Anna Nishimura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 143 days.

(21) Appl. No.: 13/109,084

(22) Filed: May 17, 2011

(65) Prior Publication Data

US 2011/0290520 A1 Dec. 1, 2011

(30) Foreign Application Priority Data

May 26, 2010 (JP) ................................ 2010-120653

(51) Int. Cl.
 *H01L 23/045* (2006.01)
 *H01L 23/055* (2006.01)
(52) U.S. Cl. ..................... 174/50.59; 174/554; 174/50.5
(58) Field of Classification Search ................ 174/50.5, 174/50.59, 554; 439/558, 604
 See application file for complete search history.

(56) References Cited

U.S. PATENT DOCUMENTS

| | | | |
|---|---|---|---|
| 5,593,320 A | 1/1997 | Konda et al. | |
| 5,618,206 A | 4/1997 | Sawada et al. | |
| 6,087,584 A * | 7/2000 | Daoud | 174/50.59 |
| 6,398,585 B1 | 6/2002 | Fukuda | |
| 6,489,559 B2 * | 12/2002 | Nakata et al. | 174/651 |
| 6,509,525 B2 * | 1/2003 | Honkomp et al. | 174/50.52 |
| 6,511,337 B1 * | 1/2003 | Fandrey et al. | 439/320 |
| 6,747,207 B2 * | 6/2004 | Alfonsi et al. | 174/650 |
| 7,071,416 B2 * | 7/2006 | Ricco et al. | 174/100 |
| 7,115,822 B1 * | 10/2006 | Day et al. | 174/662 |
| 7,745,725 B2 * | 6/2010 | Paterek et al. | 174/50.52 |
| 2002/0013089 A1 * | 1/2002 | Ichio et al. | 439/587 |
| 2002/0052141 A1 * | 5/2002 | Hattori et al. | 439/587 |
| 2003/0201112 A1 * | 10/2003 | Sridhar et al. | 174/50.59 |
| 2005/0092507 A1 * | 5/2005 | Marshall et al. | 174/50.59 |
| 2005/0118850 A1 * | 6/2005 | Ito | 439/275 |
| 2008/0003876 A1 | 1/2008 | Fukaya | |

FOREIGN PATENT DOCUMENTS

| | | |
|---|---|---|
| DE | 4414533 | 11/1994 |
| JP | 2001-21066 | 1/2001 |
| WO | 2010001814 | 1/2010 |

* cited by examiner

*Primary Examiner* — Hung Ngo
(74) *Attorney, Agent, or Firm* — Gerald E. Hespos; Michael J. Porco; Matthew T Hespos

(57) ABSTRACT

A sealing structure for wire lead-out hole is provided with a wire lead-out hole (11) formed in a case (10), a resilient seal (20) to be mounted into the wire lead-out hole (11), and a bracket (40) for retaining the resilient seal (20) in the wire lead-out hole (11) by being fixed to the case (10). The resilient seal (20) includes a seal main body (21) including a plurality of wire insertion holes (22) for allowing insertion of wires (Y), outer lips (24) formed on the outer peripheral surface of the seal main body (21), inner lips (23) formed on the inner peripheral surfaces of the wire insertion holes (22), and a wire protecting portion (25) provided on the seal main body (21).

8 Claims, 10 Drawing Sheets

SEALING STRUCTURE FOR WIRE LEAD-OUT HOLE

BACKGROUND OF THE INVENTION

1. Field of the Invention

The present invention relates to a sealing structure for wire lead-out hole.

2. Description of the Related Art

Japanese Unexamined Patent Publication No. 2001-21066 discloses a wire clamp fixed to a wire lead-out hole of a case that protects an electronic device, such as a control panel. The wire clamp is adapted to hold a wire connected to the electronic device in the case. This wire clamp includes a clamp main body through which the wire is insertable, a nut for fixing the clamp main body to the case, a cap to be mounted on the leading end of the clamp main body and a sleeve. The sleeve is made of a resilient material and is pressed by the cap to grip the wire. This wire clamp further includes a sealing structure composed of a rubber packing for sealing between the wire inserted through the interior of the resilient sleeve and the resilient sleeve, a first O-ring for sealing between the clamp main body and the sleeve, a second O-ring for sealing between the clamp main body and the case to prevent entry of dust, water and the like into the case.

The sealing structure for the wire lead-out hole disclosed in U.S. Pat. No. 5,593,320 requires the wire to be inserted through a plurality of parts, such as the clamp main body, the resilient sleeve and the respective sealing members (rubber packing, O-rings) when the wire is mounted into the wire lead-out hole. Thus, assembling operability is poor. If there is an error in an inserting order of the wire through the respective parts or if the assembler forgets to insert the wire through some of the parts, it is necessary to remove the respective parts from the wire and insert the wire again. Thus, working efficiency becomes very poor. The plural complicated parts of this wire clamp also increase costs.

The invention was developed in view of the above situation and an object thereof is to allow a simple sealing of a wire lead-out hole.

SUMMARY OF THE INVENTION

The invention relates to a sealing structure for a wire lead-out hole formed in a case and having a stepped configuration in which a large-diameter portion and a small-diameter portion are connected. The sealing structure further includes a resilient seal that is mounted into the wire lead-out hole and a retaining or pressing member that is fixed to the case for retaining the resilient seal in the wire lead-out hole. The resilient seal includes a seal main body with a wire insertion hole for allowing insertion of a wire. At least one outer lip is formed on the outer peripheral surface of the seal main body and is held in close contact with the inner peripheral surface of the large-diameter portion. At least one inner lip is formed on the inner peripheral surface of the wire insertion hole and is held in close contact with the outer peripheral surface of the wire. A wire protecting portion projects from one end surface of the seal main body and is between the inner peripheral surface of the small-diameter portion and the outer peripheral surface of the wire.

The sealing structure prevents entry of fluid or a liquid, such as water, or other elements such as dust or the like through a clearance between the wire and the case. Additionally, the wire protecting portion prevents the wire from being damaged due to contact with an opening of a small-diameter portion of the wire lead-out hole. Further, the number of parts is reduced, as compared with conventional products. Thus, the sealing structure can be assembled more easily, more quickly and with fewer assembly errors. Further, a reduction in the number of the parts can contribute to a cost reduction.

The wire protecting portion may project outwardly of the wire lead-out hole from an opening of the wire lead-out hole. Accordingly, the wire will not contact the opening of the wire lead-out hole.

The seal main body may include a plurality of wire insertion holes; and a plurality of wire insertion paths that communicate with the plurality of wire insertion holes may be formed in the wire protecting portion. Accordingly, the wires can be guided easily to the wire insertion holes without entanglement in the wire protecting portion.

The wire protecting portion may be formed with a wire insertion recess that is open at an end surface opposite to the seal main body and with which all the wire insertion holes communicate.

To form a seal with long and narrow holes continuous with wire insertion holes in a wire protecting portion by injection molding, it is necessary to prepare a mold with long and narrow shafts having a length that is the sum of the lengths of a seal main body and the wire protecting portion. However, according to this construction, the length of the shafts of the mold can be set at the length of the seal main body and strength of the shafts can be increased as compared with a mold including long and narrow shafts having a length equal to the sum of the lengths of the seal main body and the wire protecting portion. Further, a mold structure can be simplified, thereby suppressing mold cost. Further, since the interior of the wire insertion recess requires no material upon forming the resilient seal, material cost can be reduced by the volume of the wire insertion recess.

Slits may be formed in the peripheral wall of the wire insertion recess from an opening of the wire insertion recess toward the seal main body. Thus, the wire can be inserted into the wire insertion path from the wire protecting portion while the peripheral wall of the wire protecting portion is turned out, thereby facilitating assembly.

The retaining or pressing member may comprise a bracket including a retaining plate that includes an insertion hole for allowing insertion of the wire. The retaining plate can contact an end surface of the seal main body.

The retaining or pressing member may further comprise mounting pieces that are located at end portions of the retaining plate and fix the retaining plate to the case. According to this construction, the bracket for retaining the resilient seal member can be produced very easily and at low cost by punching a metal plate by a press.

The retaining plate may be formed with a wire insertion groove for allowing insertion of the wire between the outer peripheral surface of the retaining plate and the inner peripheral surface of the insertion hole. According to this construction, it is not necessary to insert the wire through the bracket beforehand. Rather, the wire can be inserted into the insertion hole through the wire insertion groove and the bracket can be fixed to the case after the resilient seal having the wire inserted therethrough beforehand is mounted into the wire lead-out hole. Thus, assembling operability can be improved.

These and other objects, features and advantages of the invention will become more apparent upon reading the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A first embodiment of the invention is described with reference to FIGS. 1 to 6. A sealing structure for wire lead-out hole according to this embodiment is illustrated such that a resilient seal 20 is to be inserted in a wire lead-out hole 11 formed in a case 10 that protects, for example, an electronic device such as a control panel and a bracket 40 is to be mounted to retain the resilient seal 20 in the wire lead-out hole 11 as shown in FIG. 4.

Figure 4:
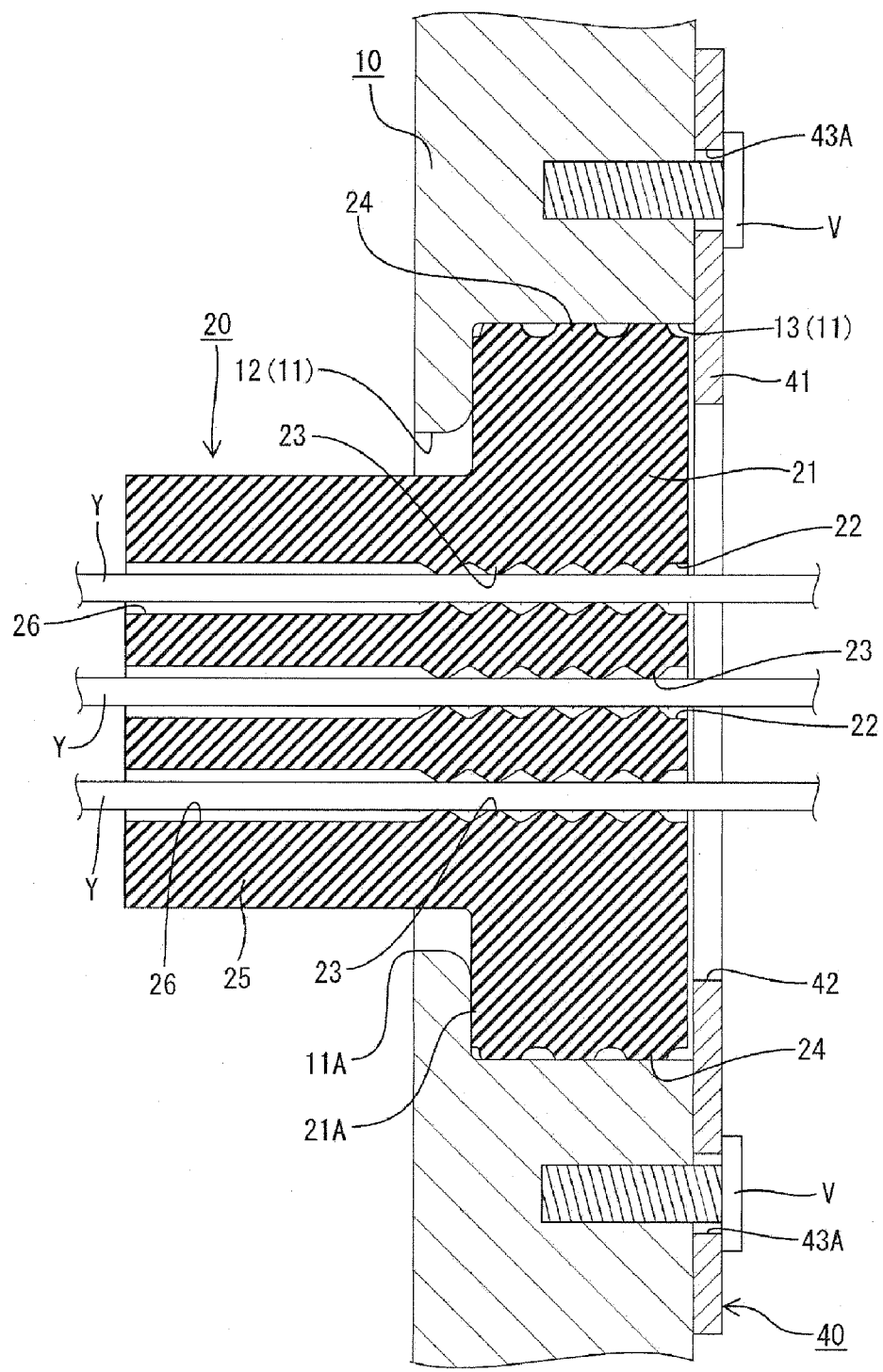
FIG. 4 is a section showing a state where the resilient seal and a bracket are mounted in and at a wire lead-out hole of a case.

The wire lead-out hole 11 has a small-diameter portion 12 extending toward an inner side of the case 10 and a large-diameter portion 13 extending to an outer side of the case 10 and connected to the small-diameter portion 12 via a step as shown in FIG. 4. The large-diameter portion 13 is widened over the entire circumference as compared to the small-diameter portion 12, and an opening formed in an outer surface of the case 10 by the large-diameter portion 13 has a circular shape. Accordingly, the wire lead-out hole has a stepped-like configuration (see e.g. FIG. 4). The smaller-diameter portion 12 has at least part of its inner edges being rounded along its complete circumference.

Figure 1:
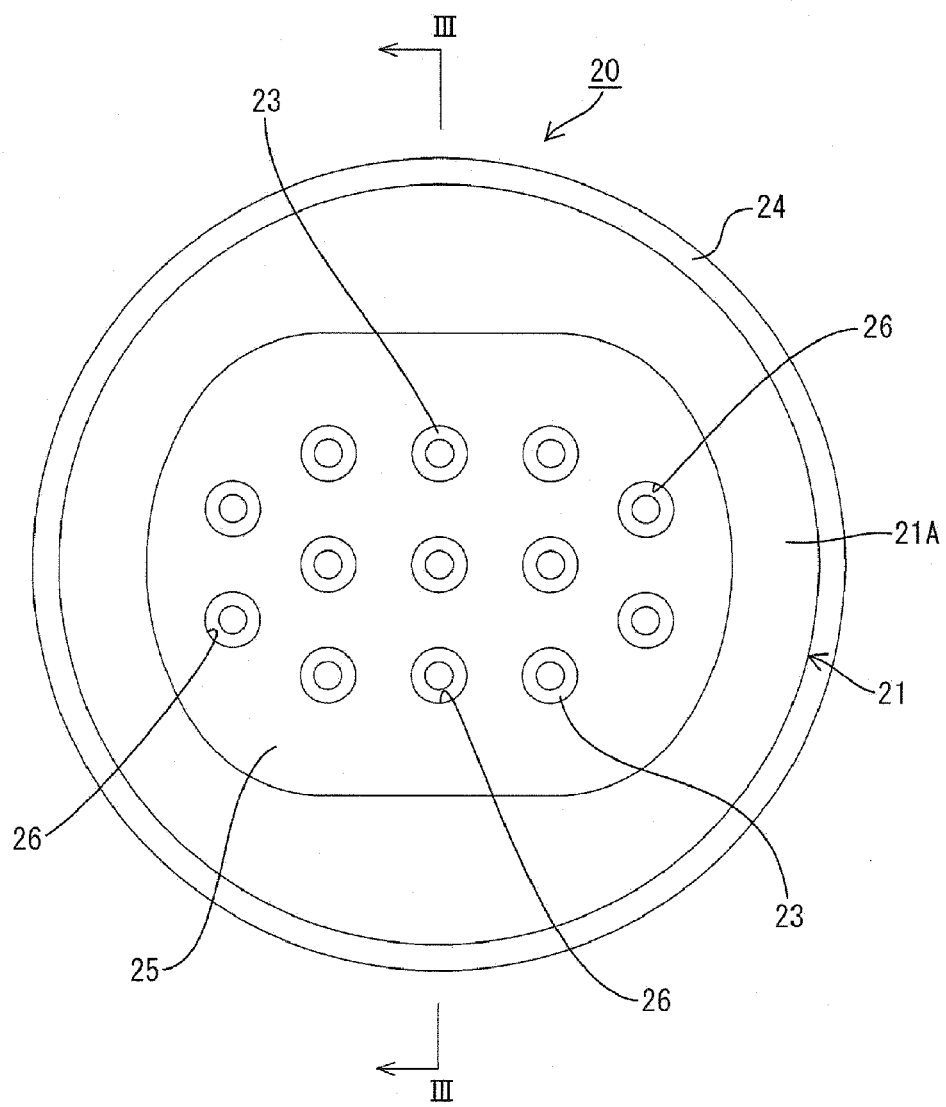
FIG. 1 is a front view of a resilient seal according to a first embodiment.
Figure 2:
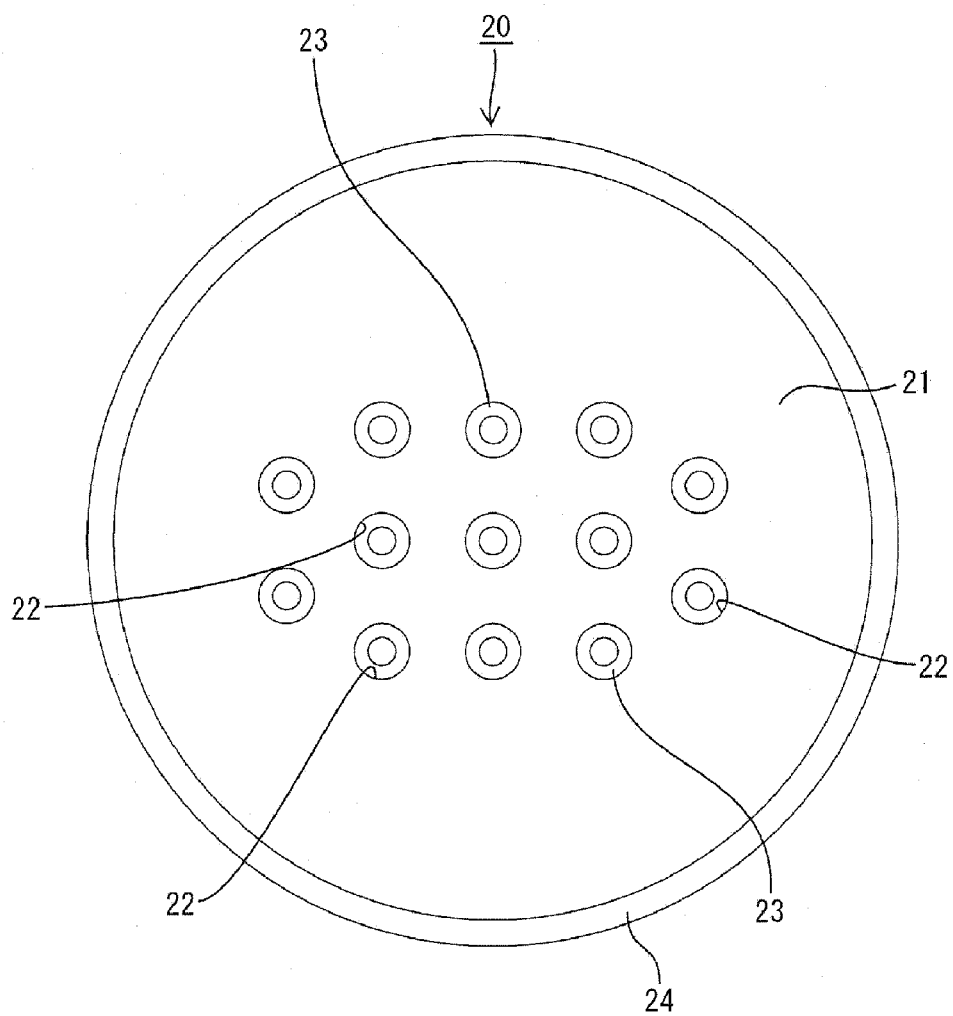
FIG. 2 is a rear view of the resilient seal.
Figure 3:
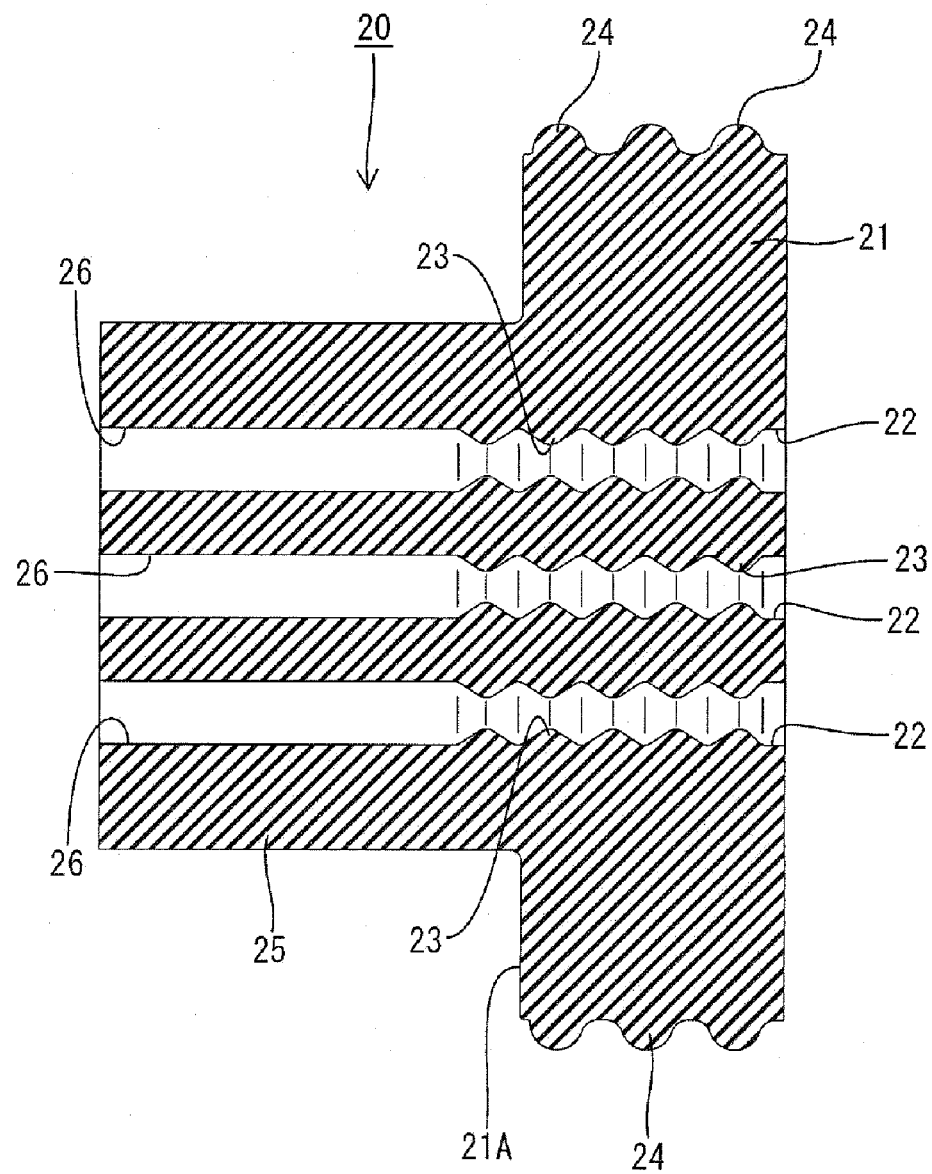
FIG. 3 is a section along III-III of FIG. 1.

The resilient seal 20 is, for example, made of a resilient material such as silicone or rubber and includes a substantially cylindrical seal main body 21, as shown in FIGS. 1 to 3. The outer diameter of this seal main body 21 is somewhat smaller than the inner diameter of the large-diameter portion 13 of the wire lead-out hole 11. Further, the thickness of the seal main body 21 is set to be substantially equal to the length from the opening of the large-diameter portion 13 formed in the case 10 to the small-diameter portion 12. Accordingly, the seal main body 21 can be fit and accommodated in the large-diameter portion 13 of the wire lead-out hole 11, as shown in FIG. 4.

Rounded outer lips 24 are formed on the outer peripheral surface of the seal main body 21. The outer lips 24 are to be held in close contact with the inner peripheral surface of the large-diameter portion 13 over the entire circumference to seal between the large-diameter portion 13 and the seal main body 21 in a fluid- or liquid-tight manner, as shown in FIG. 4, when the seal main body 21 is accommodated in the large-diameter portion 13 of the wire lead-out hole 11.

One or more, particularly a plurality of wire insertion holes 22 substantially extending in a thickness direction of the seal main body 21 is formed in the seal main body 21. One or more, particularly a plurality of inner lip portions 23 are formed on the inner peripheral surface of the (particularly each) wire insertion hole 22. These inner lip portions 23 are to be held in close contact with the outer peripheral surface of a wire Y to seal between the wire Y and the seal main body 21 in a fluid- or liquid-tight manner as shown in FIG. 4 when the wire Y is inserted into the wire insertion hole 22.

Figure 5:
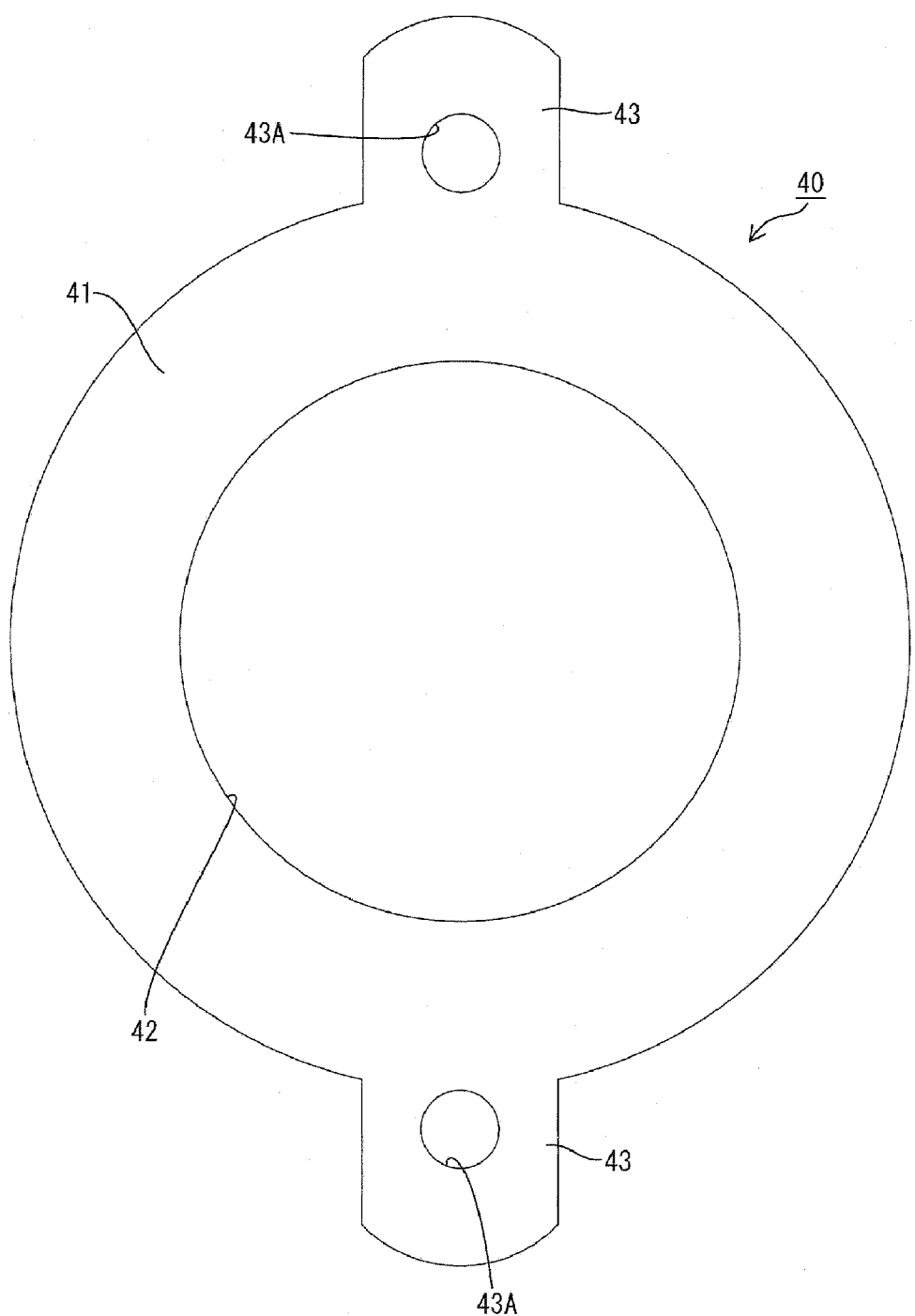
FIG. 5 is a front view of a bracket including an O-shaped retaining plate.

On the other hand, the bracket 40 is formed particularly by punching or cutting a plate material (such as a metal plate) by a press. As shown in FIG. 5, the bracket 40 includes a substantially ring- or O-shaped retaining plate 41 (particularly with a substantially circular shape), an insertion hole 42 formed in (or substantially around) the center of the retaining plate 41, and mounting pieces 43 provided at (particularly substantially opposite and/or upper and lower end portions of) the retaining plate 41.

The outer diameter of the retaining plate 41 is set to be larger than the inner diameter of the large-diameter portion 13 of the wire lead-out hole 11.

The insertion hole 42 particularly substantially has a circular shape, and/or the inner diameter thereof is set to be smaller than the outer diameter of the seal main body 21 of the seal member 20. Thus, the retaining plate 41 closes the large-diameter portion 13 of the wire lead-out hole 11 to retain the resilient seal member 20 at least partly accommodated in the wire lead-out hole 11 as shown in FIG. 4 when the bracket 40 is fixed to the housing 10.

The inner diameter of the insertion hole 42 is set such that all the wire insertion holes 22 in the seal main body 21 at least partly are accommodated inside the insertion hole 42. Thus, one or more, particularly a plurality of wires Y drawn out from the wire insertion holes 22 of the seal main body 21 are or can be collectively inserted through the insertion hole 42 as shown in FIG. 4.

Figure 6:
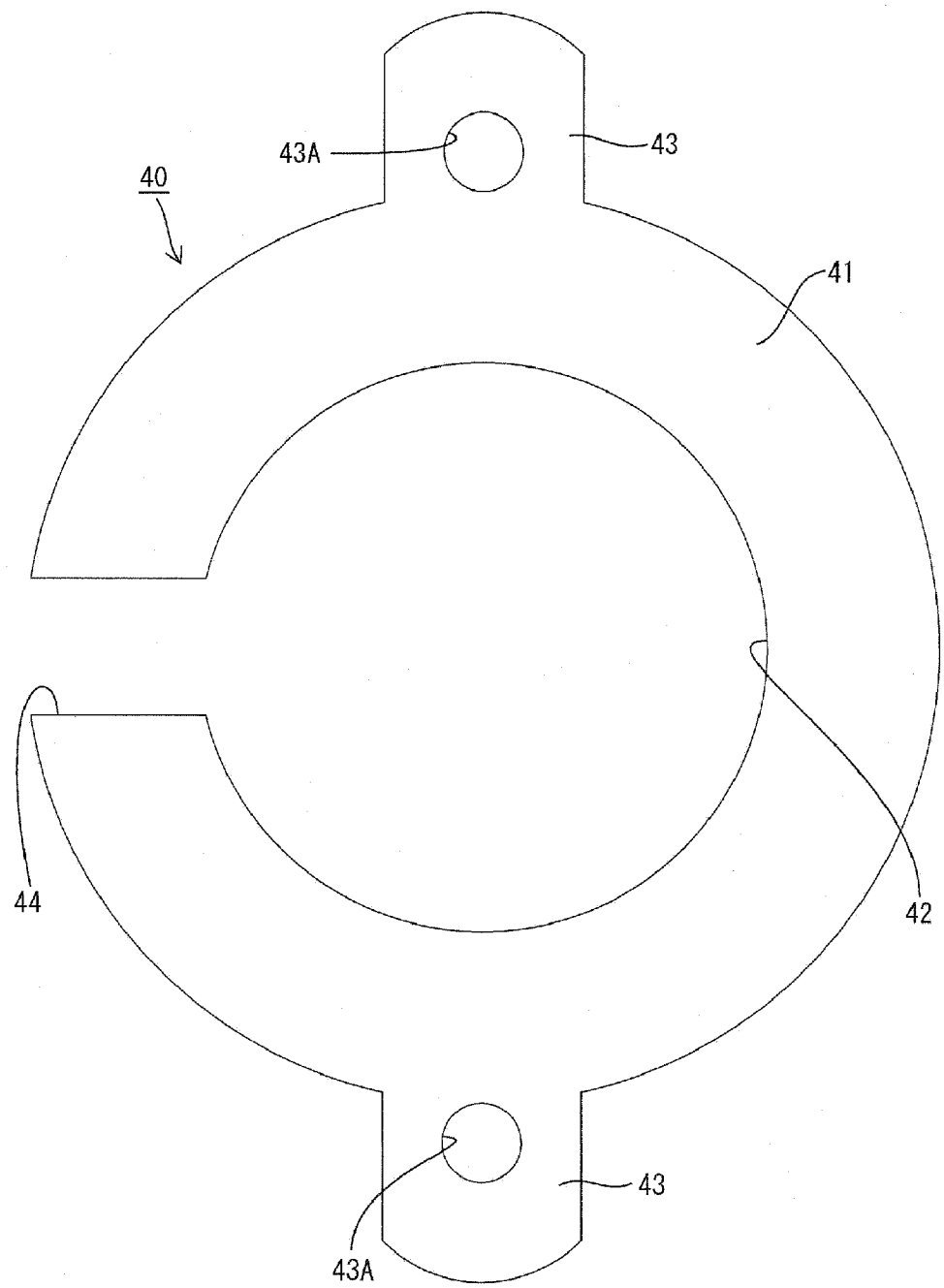
FIG. 6 is a front view of a bracket including a C-shaped retaining plate.

A bolt insertion hole 43A is formed in (particularly a substantially central part of) each mounting piece 43. As shown in FIG. 4, the bracket 40 is or can be fixed to the case 10 by at least partly inserting tightening bolts V (or mounting plugs) into the bolt insertion holes 43A and tightening or fixing them into the case 10. Note that the bracket 40 may have a C shape by cutting off a part of the retaining plate 41 to form a wire insertion groove 44 as shown in FIG. 6. By this, the bracket 40 can be fixed to the case 10 by inserting the wires Y into the insertion hole 42 through the wire insertion groove 44 after the seal member 20 having the wires Y inserted therethrough beforehand is mounted into the wire lead-out hole 11 without inserting the wires Y through the bracket 40 beforehand.

A wire protecting portion 25 integrally or unitarily formed to the seal main body 21 projects from an end surface 21A of the seal main body 21 of the resilient seal member 20.

The wire protecting portion 25 is in the form of a particularly substantially rectangular column with four rounded corners and is narrower than the seal main body 21 over the entire circumference as shown in FIGS. 1 and 3. It should be understood, however, that the wire protecting portion 25 may be in the form of a polygonal or cylindrical or elliptical shape. One or more, particularly a plurality of wire insertion paths 26 are formed in this wire protecting portion 25. The wire insertion paths 26 particularly are formed to have the substantially same diameter as the wire insertion holes 22 of the seal main body 21 and communicate with the wire insertion holes 22. In a specific embodiment, the wire insertion paths 26 may be formed to have a variable inner diameter (e.g. a substantially conical diameter) being decreasing along the longitudinal direction of the wire protecting portion 25 towards the wire insertion holes 22, wherein the diameter at the distal end of the wire insertion paths 26 is substantially equal to that of the wire insertion holes 22 so as to allow a smooth passage of the inserted wire from the wire insertion paths 26 to the wire insertion holes 22. A projecting distance of the wire protecting portion 25 from the seal main body 21 is set to be longer than the length of the small-diameter portion 12 (i.e. its thickness extension in a thickness direction or a direction normal to a plane of the case 10) of the wire lead-out hole 11 in an axial or longitudinal direction. Thus, when the resilient seal member 20 is inserted into the wire lead-out hole 11, a base end portion of the wire protecting portion 25 is arranged in the small-diameter portion 12 of the wire lead-out hole 11 and the remaining part projects toward the inner side of the case 10 from the small-diameter portion 12. Thus, the wire protecting portion 25 can prevent the wires Y drawn out from the wire lead-out hole 11 to the interior of the case 10 from coming into contact with the opening 11A of the wire lead-out hole 11A and from being damaged.

The first embodiment is constructed as described above. Next, an operation of mounting the resilient seal 20 and the bracket 40 is briefly described.

First, the wires Y are inserted into the wire insertion paths 26 from the wire protecting portion 25 of the resilient seal member 20 and further into the wire insertion holes 22. In this process, since the wire protecting portion 25 is formed with the wire insertion paths 26 for substantially guiding the wires Y to the wire insertion holes 22, the wires Y can be easily guided to the wire insertion holes 22, wherefore operability in inserting the wires Y can be improved. Further, since the respective wire insertion paths 26 particularly are independent in the wire protecting portion 25, entanglement of a plurality of wires Y can be prevented.

Further, the inner lip portions 23 of the wire insertion holes 22 are to be held in close contact with the outer peripheral surfaces of the wires Y to seal between the wires Y and the resilient seal member 20 in a fluid- or liquid-tight manner.

Subsequently, the resilient seal member 20 having the wires Y inserted therethrough at least partly is fitted into the wire lead-out hole 11 from the outer side of the case 10 and inserted until the end surface 21A of the seal main body 21 substantially comes into surface contact with a step surface as a boundary between the small-diameter portion 12 and the large-diameter portion 13 of the wire lead-out hole 11. At this time, since the wire protecting portion 25 projects into the case 10 through the opening of the small-diameter portion 12 of the wire lead-out hole 11, the wires Y can be prevented from coming into contact with the opening 11A of the wire lead-out hole 11 and from being damaged. Further, the outer lip portions 24 of the seal main body 21 are held in close contact with the inner peripheral surface of the wire lead-out hole 11 to seal between the case 10 and the resilient seal member 20 in a fluid- or liquid-tight manner. Further, a pressure acts toward the center of the seal main body 21 by the close contact of the outer lip portions 24 with the inner peripheral surface of the wire lead-out hole 11 over the entire circumference, whereby the inner lip portions 23 are more closely held substantially in contact with the outer peripheral surfaces of the wires Y. Thus, entrance of dust, water and the like into the case 10 can be reliably prevented.

After the resilient seal member 20 is completely or properly inserted into the wire lead-out hole 11, the bracket 40 is pressed from the outer side of the wire lead-out hole 11 and the one or more tightening bolts V are tightened into the case 10, whereby the bracket 40 is fixed to the case 10 while retaining the resilient seal member 20.

As described above, in this embodiment, the contact of the wires Y with the opening 11A of the wire lead-out hole 11 can be prevented and the number of the parts of the sealing structure in the wire lead-out hole 11 can be reduced to about half as compared with conventional products. Thus, an operation of inserting the wires Y through the respective parts beforehand is reduced to half and an assembling operation by an operator can be drastically improved. Further, since the number of parts through which the wires Y are inserted is reduced, troubles such as an error in an insertion order can also be prevented. In the case of providing the bracket 40 with the wire insertion groove 44, the wires Y need not be inserted through the bracket 40 beforehand. Troubles such as an error in an insertion order do not occur at all and a burden on the operator can be drastically reduced. Further, a reduction in the number of the parts can contribute to a cost reduction.

Figure 7:
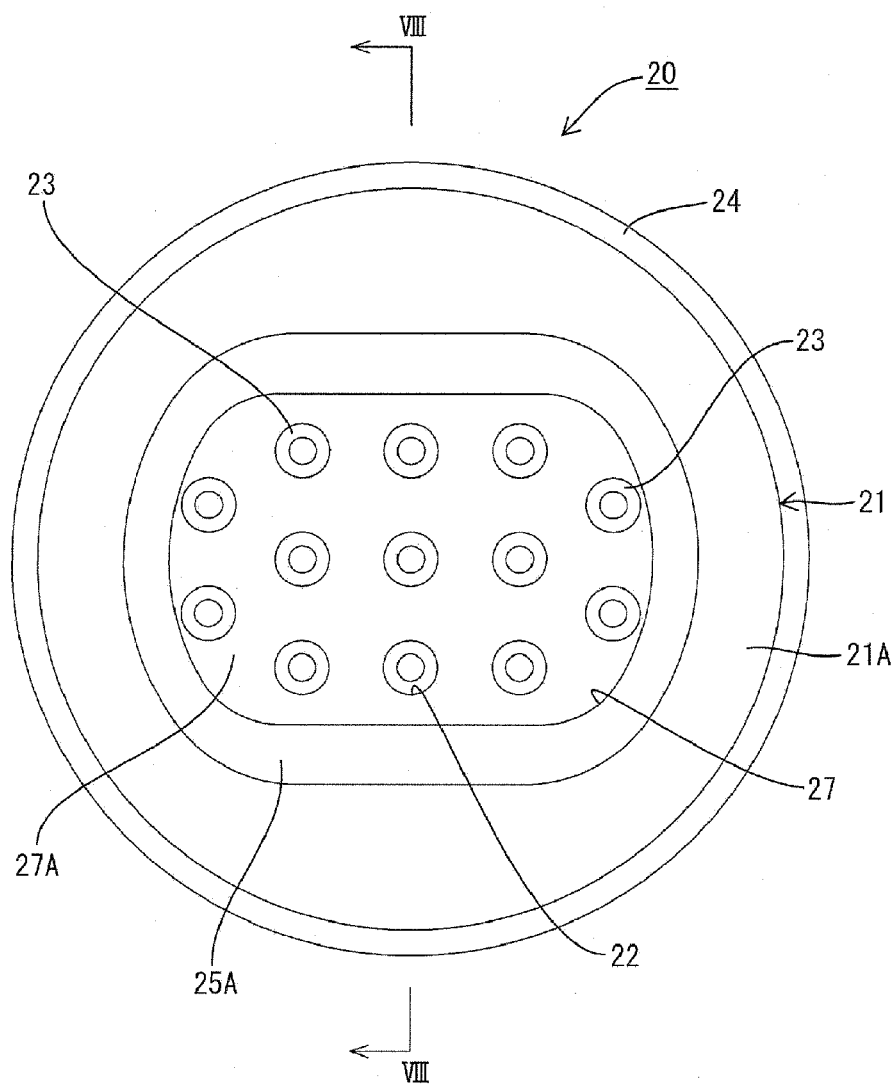
FIG. 7 is a front view of a resilient seal according to a second embodiment.

A second embodiment of the invention is described with reference to FIGS. 7 and 8. A sealing structure of the second embodiment differs from the first embodiment in the construction of the wire protecting portion 25 of the resilient seal member 20. The similar or substantially same constructions as in the first embodiment are identified by the same reference numerals. Further, the similar or substantially same constructions, functions and effects as in the first embodiment are not described.

Figure 8:
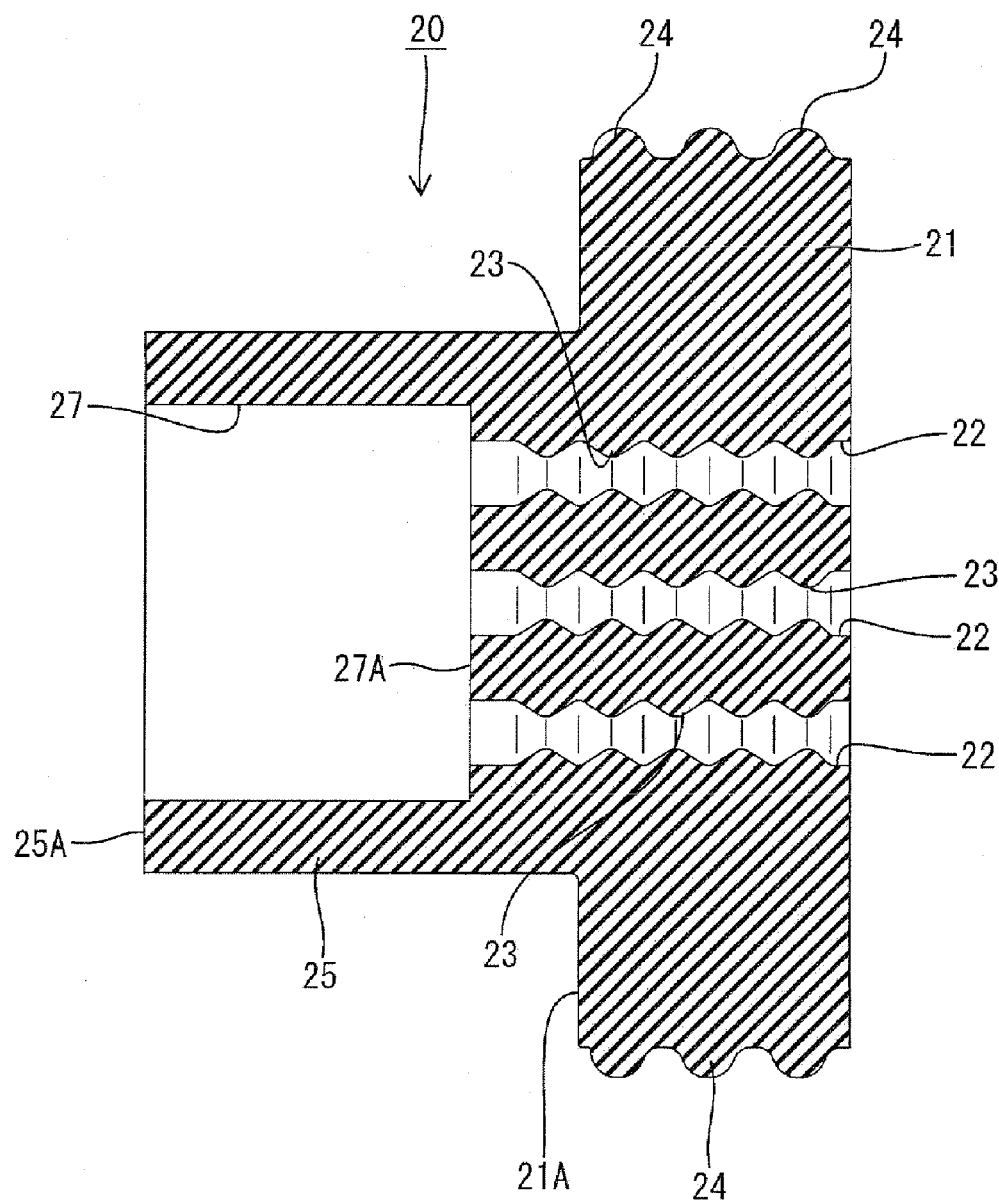
FIG. 8 is a section along VIII-VIII of FIG. 7.

A wire protecting portion 25 of a resilient seal member 20 in the second embodiment is formed with a wire insertion recess 27 in an end surface 25A (projecting surface of the wire protecting portion 25) substantially opposite to a seal main body 21 as shown in FIG. 8. Thus, the peripheral wall of the wire insertion recess 27 is set to have such a thickness as to be substantially resiliently deformable. All wire insertion holes 22 of the seal main body 21 are open in a back wall 27A of the wire insertion recess 27, and the wire insertion recess 27 and all the wire insertion holes 22 communicate.

According to this construction, particularly material cost can be reduced by the volume of the wire insertion recess 27 upon forming the resilient seal member 20. In order to form long and narrow holes (wire insertion paths 26 in the first embodiment) continuous with the wire insertion holes 22 in the wire protecting portion 25, a mold needs to be formed with long and narrow shaft portions having a length which is the sum of the length of the seal main body 21 and that of the wire protecting portion 25. However, by providing the wire protecting portion 25 with the wire insertion recess 27, the length of the shaft portions of the mold can be set at the length of the seal main body and strength of the shaft portions can be increased as compared with a mold including long and narrow shaft portions having a length equal to the sum of the length of the seal main body and that of the wire protecting portion. Further, a mold structure can be simplified as compared with a mold including shaft portions longer than the length of the seal main body 21, which is effective in suppressing mold cost.

A third embodiment of the invention is described with reference to FIGS. 9 and 10. A sealing structure of the third embodiment differs from the second embodiment in the construction of the wire protecting portion 25 of the resilient seal 20. The similar or substantially same constructions as in the second embodiment are identified by the same reference numerals. Further, the similar or substantially same constructions, functions and effects as in the second embodiment are not described.

Figure 9:
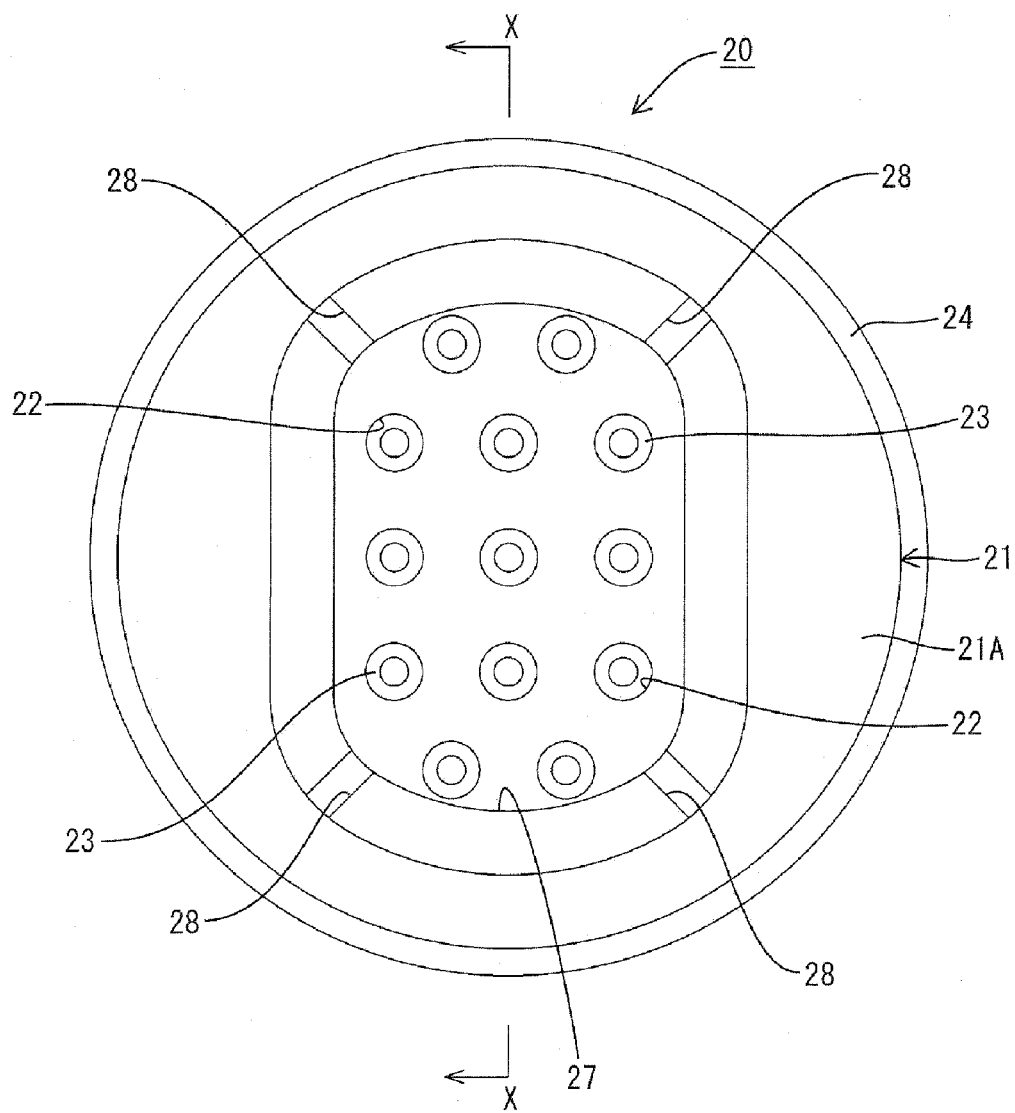
FIG. 9 is a front view of a resilient seal according to a third embodiment.
Figure 10:
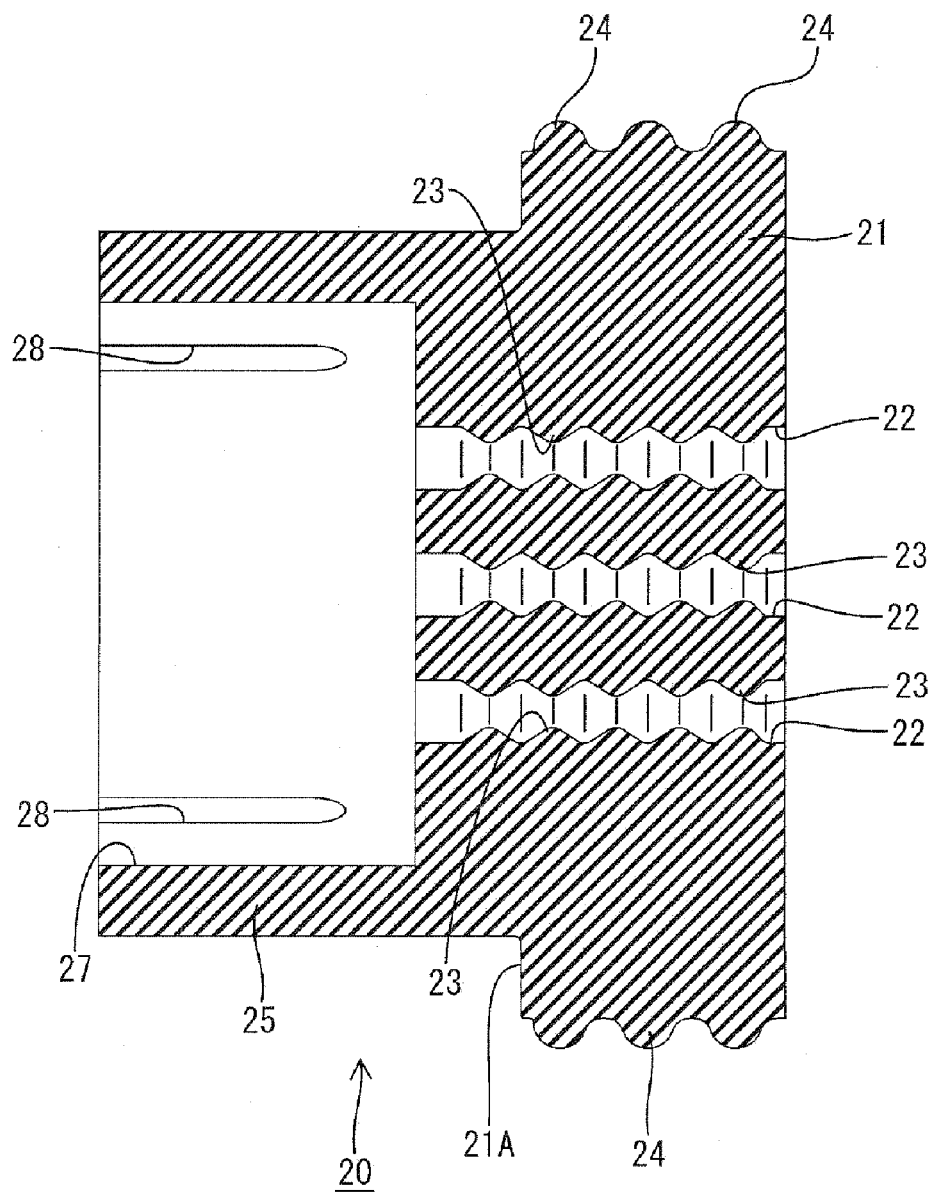
FIG. 10 is a section along X-X of FIG. 9.

In a wire protecting portion 25 of the third embodiment, slits 28 are formed in the peripheral wall of the wire protecting portion 25 as shown in FIGS. 9 and 10. These slits 28 are formed at or near four corners of the wire protecting portion 25 and/or substantially extend straight from an opening of a wire insertion recess 27 toward a seal main body 21.

According to this construction, in the case of inserting wires into wire insertion holes 22 from the wire insertion recess 27, an operator's hand can be inserted to the back of the wire insertion recess 27 by turning the peripheral wall of the wire protecting portion 25 outwardly. Thus, ends of wires Y can be more easily inserted into the wire insertion holes 22 and operability in mounting the wires Y can be improved.

The present invention is not limited to the above described and illustrated embodiments. For example, the following embodiments are also included in the technical scope of the present invention as defined by the claims.

Although the length of the wire protecting portion 25 is longer (in an axial or longitudinal direction) than that of the small-diameter portion 12 of the wire lead-out hole 11 in the above embodiments, the invention is not limited to such a mode. According to the present invention, the length of the wire protecting portion 25 may be, for example, set to be substantially equal to that of the small-diameter portion 12. The length of the wire protecting portion 25 may be so set that the wires Y inserted into the wire protecting portion 25 do not come into contact with the opening of the wire lead-out hole 11.

Although the wire protecting portion 25 is in the form of a rectangular column with four rounded corners in the above embodiments, the invention is not limited to such a mode and the wire protecting portion 25 may be, for example, in the form of a cylinder.

Although the small-diameter portion 12 of the wire lead-out hole 11 is provided at the inner side of the case 10 and the large-diameter portion 13 is arranged at the outer side of the case 10, the present invention is not limited to such a mode. The small-diameter portion 12 of the wire lead-out hole 11 may be provided at the outer side of the case 10, the large-diameter portion 13 may be provided at the inner side of the case 10, and the seal member 20 may be retained by the bracket 40 from the inner side of the case 10.

Although the slits 28 are formed at or near the four corners of the peripheral wall of the wire protecting portion 25 in the third embodiment, the present invention is not limited to such a mode. For example, the number of slits may be increased or decreased according to the thickness of the peripheral wall of the wire protecting portion 25 to such an extent that the peripheral wall is not naturally deflected.

What is claimed is:

1. A sealing structure for wire lead-out hole, comprising:
    a wire lead-out hole formed in a case and having a substantially stepped configuration in which a large-diameter portion and a small-diameter portion are connected;
    a resilient seal mounted in the wire lead-out hole and including:
        a seal main body including at least one wire insertion hole for allowing insertion of at least one wire;
        at least one outer lip formed on an outer peripheral surface of the seal main body and held in close contact with the inner peripheral surface of the large-diameter portion;
        at least one inner lip formed on an inner peripheral surface of the wire insertion hole and held in close contact with the outer peripheral surface of the wire; and
        a wire protecting portion projecting from one end surface of the seal main body and provided between the inner peripheral surface of the small-diameter portion and the outer peripheral surface of the wire; and
    a retainer fixed to the case and retaining the resilient seal in the wire lead-out hole.

2. The sealing structure of claim 1, wherein the wire protecting portion projects out of the wire lead-out hole from an opening of the wire lead-out hole.

3. The sealing structure of claim 2, wherein the wire protecting portion is formed with a wire insertion recess open at an end surface opposite to the seal main body and with which all of the wire insertion holes communicate.

4. The sealing structure of claim 3, wherein a plurality of slits are formed in the peripheral wall of the wire insertion recess from an opening of the wire insertion recess toward the seal main body.

5. The sealing structure of claim 1, wherein the at least one wire insertion hole comprises plural wire insertion holes and the wire protecting portion includes plural wire insertion paths that communicate with the wire insertion holes.

6. The sealing structure of claim 1, wherein the retainer comprises a bracket including a retaining plate with an insertion hole for allowing insertion of the wire, the retaining plate contacting an end surface of the seal main body.

7. The sealing structure of claim 6, wherein the retainer comprises mounting pieces at ends of the retaining plate and fixing the retaining plate to the case.

8. The sealing structure of claim 6, wherein the retaining plate is formed with a wire insertion groove for allowing insertion of the wire between the outer peripheral surface of the retaining plate and the inner peripheral surface of the insertion hole.

* * * * *